United States Patent [19]

Harhoff et al.

[11] Patent Number: 4,714,154

[45] Date of Patent: Dec. 22, 1987

[54] MATERIAL AND TRANSFER LOADING APPARATUS

[75] Inventors: Karl Harhoff, Werne; Egon Melis, Lünen, both of Fed. Rep. of Germany

[73] Assignee: Gewerkschaft Eisenhutte Westfalia GmbH, Lunen, Fed. Rep. of Germany

[21] Appl. No.: 942,486

[22] Filed: Dec. 16, 1986

[30] Foreign Application Priority Data

Dec. 27, 1985 [DE] Fed. Rep. of Germany ....... 3546192

[51] Int. Cl.$^4$ .............................................. B65G 65/02
[52] U.S. Cl. ..................................... 198/514; 198/745
[58] Field of Search ............... 198/514, 741, 745, 739, 198/743, 744; 299/64–67, 43–45, 18, 56

[56] References Cited

U.S. PATENT DOCUMENTS

| 3,525,446 | 8/1970 | Grafstrom ...................... 198/741 X |
| 3,680,920 | 8/1972 | Amoroso ......................... 198/514 X |
| 4,236,627 | 12/1980 | Sigott et al. ......................... 198/514 |
| 4,605,119 | 8/1986 | Keuschnigg et al. ............... 198/514 |

FOREIGN PATENT DOCUMENTS

| 3015582 | 10/1981 | Fed. Rep. of Germany . |
| 3304908 | 8/1984 | Fed. Rep. of Germany . |
| 3400868 | 7/1985 | Fed. Rep. of Germany . |
| 2645396 | 10/1985 | Fed. Rep. of Germany . |
| 1567931 | 5/1980 | United Kingdom . |
| 2157639 | 10/1985 | United Kingdom . |

Primary Examiner—Robert J. Spar
Assistant Examiner—D. Glenn Dayoan
Attorney, Agent, or Firm—Sughrue, Mion, Zinn, Macpeak and Seas

[57] ABSTRACT

A loading apparatus comprises a ramp defining a loading surface and a pair of loading blades each having a triangular cross-section with a nearly perpendicular front face and a shallow inclined rear face relative to a desired delivery direction for material collecting on the loading surface. The blades are oscillated back and forth about upstanding pivot axes relative to the loading surface. Between the blades is a component or some other means defining a step with a similar configuration to the blades with a steep front face relative to the delivery direction and a shallow inclined rear face. The step defining means assists the blades in the loading work.

13 Claims, 6 Drawing Figures

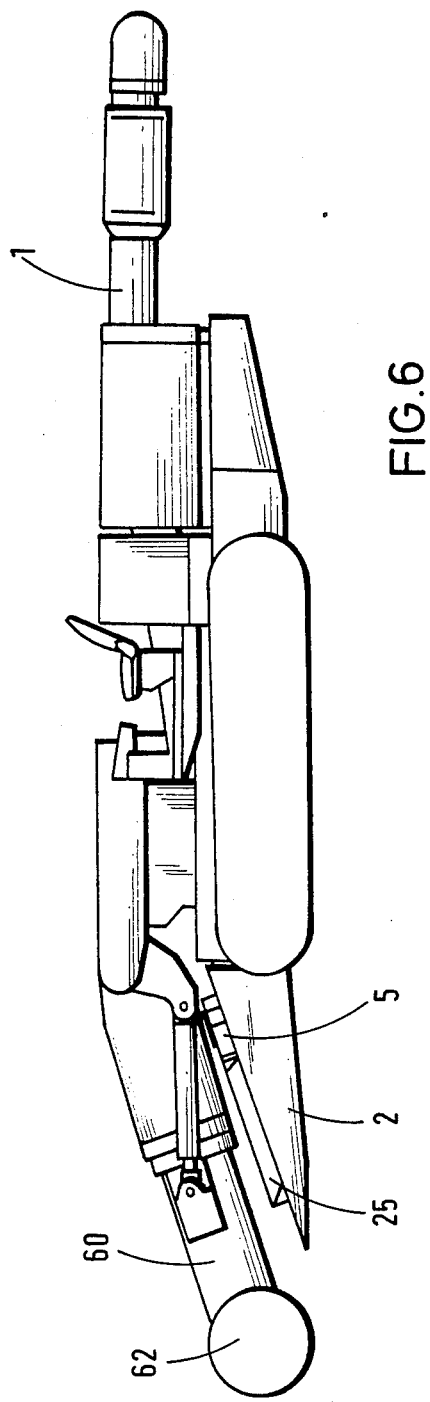

MATERIAL AND TRANSFER LOADING APPARATUS

FIELD OF THE INVENTION

The present invention relates to loading apparatus for loading loose materials. The invention is particularly, but not solely, concerned with loading apparatus for use with partial cutting machines. Such machines have a cutting arm or jib which is moved up and down and from side to side to strip mineral or to cut away the front face of a tunnel, for example.

BACKGROUND TO THE INVENTION

Loading apparatuses are known which utilise one or more loading blades which are driven back and forth in an oscillatory manner over a loading ramp to transfer material predominantly in one direction onto a conveyor. Such apparatuses are known for example, from German Patent Specification No. 2 550 051 and German Patent Specification No. 2 645 396.

A general object of the present invention is to provide an improved form of loading apparatus. A further object of the invention is to improve the loading performance of such an apparatus with the simplest possible constructional measures.

SUMMARY OF THE INVENTION

Loading apparatus in accordance with the present invention comprises a loading surface and a pair of arms or blades which are pivotably supported relative to the loading surface. The blades are driven in an oscillatory manner in unison to pass back and forth over the loading surface in delivery and return strokes one behind the other. Each blade has a steeply inclined front face relative to the delivery direction and a shallow inclined rear face. Thus, as the blades are caused to reciprocate back and forth, material collecting on the loading surface will be transferred over the loading surface predominantly by the front faces of the loading arms. In accordance with the invention, means defining a step is provided between the loading blades. This step defining means also has a steeply inclined front face relative to the delivery direction and a shallow inclined rear face. The front face of the step defining means is so located that when the foremost blade relative to the delivery direction is at the limit of its return stroke the rear face of this foremost blade is positioned closely adjacent to the front face of the step defining means. Conversely, as the rearmost blade moves in the delivery stroke it comes to a position at the end of the stroke with its steep front face closely adjacent the rear face of the step defining means. Thus as the blades are oscillated back and forth, the rearmost or following blade feeds loose material over the rear surface of the step defining means to the foremost or leading blade which then conveys the material onto a conveyor or the like. As the blades move back in their return strokes the steep front face of the step defining means prevents the leading or foremost loading blade from moving the material back into the working zone of the following loading blade to any significant extent. The provision of the step therefore improves the loading operation of the leading blade and also improves the loading operation of the following loading blade since the latter is not hindered on its delivery or working stroke by material being forced back contrary to the delivery direction. In one embodiment of the invention, the step defining means is in the form of a component shaped in a similar manner to the loading blades with a triangular cross-section and is fitted to the loading surface as by welding or by screws.

The two loading blades which move towards and away from the step defining means are preferably coupled together with the aid of a coupling rod or the like which is adjustably lengthened to thereby vary the stroke of the following blade. As a drive means for the loading blades a double-acting piston and cylinder unit can be used which is disposed in a protected position beneath the loading surface and is coupled by a lever to a pivot spindle on one of the blades. Since the main loading work is effected by the leading loading blade relative to the delivery direction, it is preferable to make this blade somewhat longer in length between its pivot axis to its distal end than the equivalent length of the following loading blade. It is also advisable to ensure that the pivot angle of the leading loading blade is somewhat greater than that of the following loading blade. The pivot axes of both loading blades, and certainly that of the following loading blade, is preferably disposed forward in relation to the steep front face of the blade in the direction towards the delivery direction and/or the receiving conveyor.

It is preferable to limit the loading surface itself with the aid of an upstanding rear wall and to ensure that the following or rearmost loading blade on its return stroke is situated closely adjacent this upstanding wall. In this way the upstanding wall prevents the following loading blade from pushing loose material over the side of the loading surface and ensures that during its return stroke the following loading blade moves through loose material trapped by the wall. Such loose material tends to rise over the shallow rear face of the following loading blade so as to be reliably entrained by the front face of this blade when the delivery stroke occurs.

Loading apparatus in accordance with the invention and constructed as aforesaid may be disposed as units on both sides of a scraper-chain conveyor laid onto the body or chassis of a cutting machine. Each unit then loads material independently onto the conveyor.

The invention may be understood more readily, and various other apsects and features of the invention may become apparent, from consideration of the following description.

BRIEF DESCRIPTION OF DRAWINGS

An embodiment of the invention will now be described by way of example only, with reference to the accompanying drawings, wherein:

FIG. 6 is a schematic side view of a partial cutting machine equipped with loading apparatus constructed in accordance with the invention.

DESCRIPTION OF PREFERRED EMBODIMENT

Apparatus represented in the accompanying drawings serves to load or transfer loose material such as spoil or debris or mineral ore and particularly material obtained in situ in a mineral mine working or in a tunnel driving site on a conveyor 1 which can take the form of a scraper-chain conveyor. The apparatus as illustrated would usually be employed with a partial-cutting machine as shown in FIG. 6. The machine is provided with a mobile jib 60 which swings up and down and from side to side and carries a cutting head 62. The conveyor 1 is laid along the machine body or chassis and the loading apparatus is disposed beneath the jib to transfer material falling from the cutting head onto the front end of the conveyor 1 which projects beyond the machine body. Material loaded onto the conveyor 1 is transported back away from the working zone to discharge at the rear onto some other conveyor or transporter.

Figure 1:
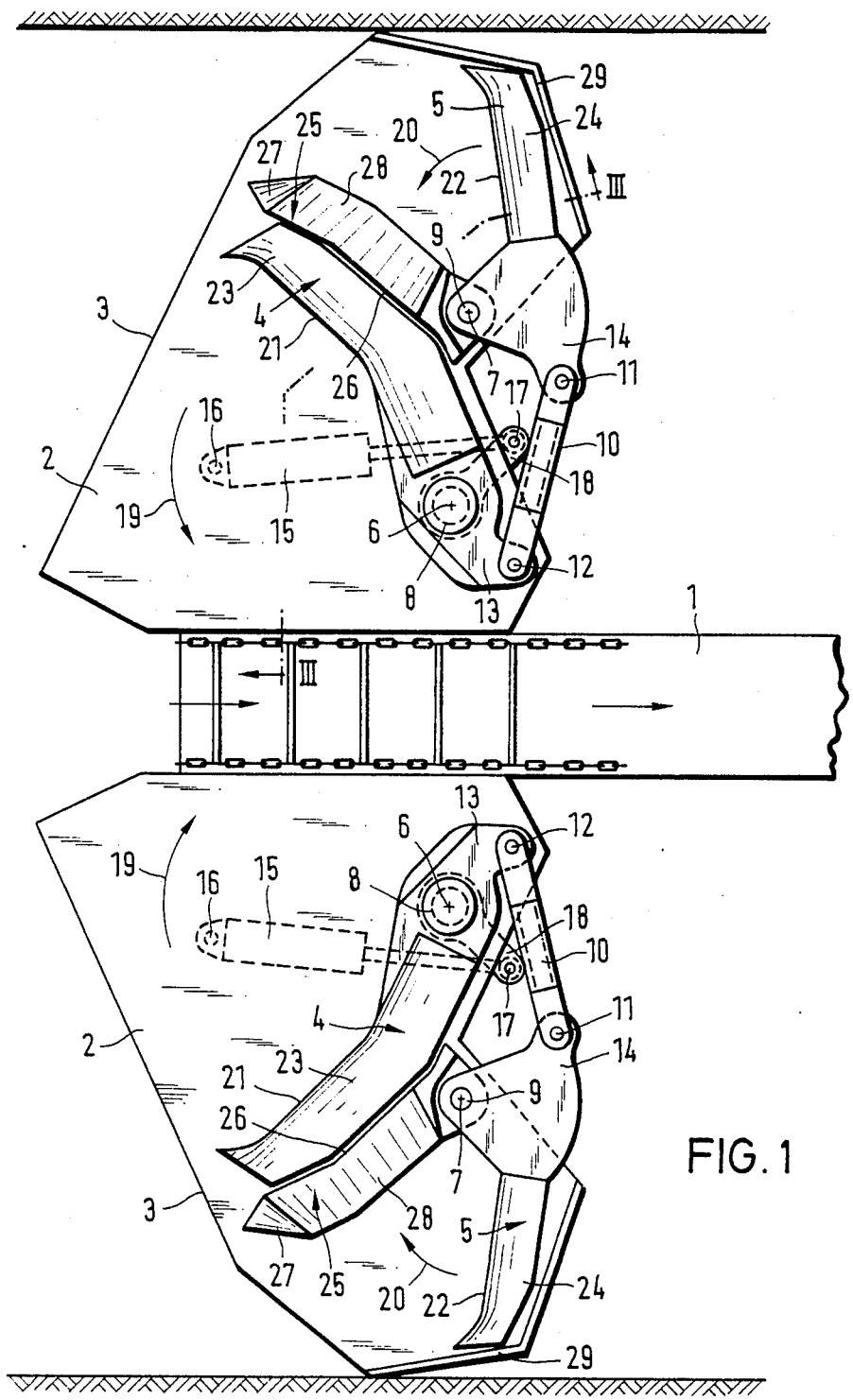
FIG. 1 is a schematic plan view of loading apparatus constructed in accordance with the invention.

As shown in FIG. 1, the loading apparatus is symmetrical in relation to the conveyor and is composed of two independent self-contained units fixed to the opposite sides of the conveyor 1 but in some cases a single unit on one side of the conveyor can be employed. For convenience only one of these units itself constituting loading apparatus will now be described. The apparatus or unit is composed of a loading ramp 2 which has a planar loading surface which rises from a forward end region 3 disposed at or close to the floor of the working to a rear end region having an upstanding wall 29. Loading blades or arms 4, 5 are mounted on the ramp 2 for pivotable reciprocation about upstanding pivot axes 6, 7 defined by journals 8, 9 rotatably connected to the ramp 2. The blades 4, 5 are drivably interconnected with the aid of a coupling member or rod 10. The rod 10 is connected via pivot joints 11, 12 with rear portions 13, 14 of the blades 4, 5. Drive means in the form of a double-acting piston and cylinder unit or ram 15 serves to drive the blades 4, 5 over the loading surface of the ramp 2. The ram 15 is mounted in a protected position beneath the ramp 2 and has its cylinder supported by a pivot joint 16 and its piston rod connected with a pivot joint 17 to a lever 18 fixed to the journal 8. As the piston rod extends and retracts, the foremost blade 4 is pivoted back and forth in the direction of arrow 19 in FIG. 1 on a forward delivery stroke and in a reverse direction to arrow 19 on a return stroke. Since the following blade 5 is coupled to the blade 4 it is forced to follow the reciprocable motion of the blade 4 moving in the direction of arrow 20 in FIG. 1 on a forward delivery stroke and in a reverse direction to arrow 20 on a return stroke.

Figure 3:
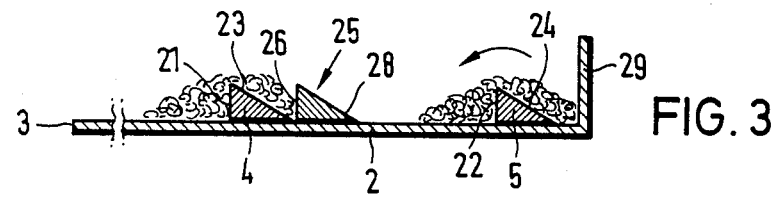
FIGS. 3, 4 and 5 are sectional views taken along the line 3—3 in FIG. 1 and showing the blades in different operating positions.
Figure 4:
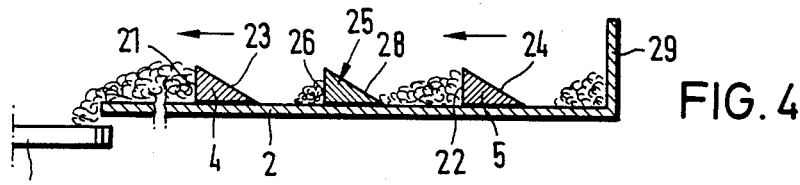
Figure 5:
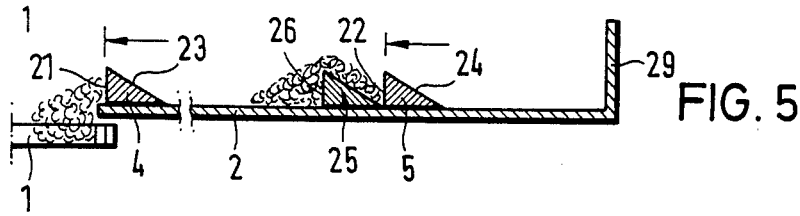

The rod 10 is adjustable in length to vary the pivotable range of the blade 5 and, for example the rod 10 may consist of two parts interconnected via a screw thread to permit such adjustment. As shown in FIGS. 3 to 5, the blades 4, 5 each have a generally triangular shaped cross-section each with a front face 21, 22 which is inclined relative to the loading surface of a comparatively steep angle in the region of 90°. Thus, when the blades 4, 5 move in the forward delivery direction (arrows 19, 20) loose material is pushed over the loading surface in the directions of the arrows 19, 20 onto the conveyor 1. The undersurfaces of the blades extend substantially parallel to the loading surface of the ramp while the rear faces 23, 24 of the blades 4, 5 are inclined at a shallow acute angle relative to the loading surface. Thus when the blades 4, 5 move in the reverse direction in the return stroke opposite to the arrows 19, 20 they pass more easily through the loose material.

Figure 2:
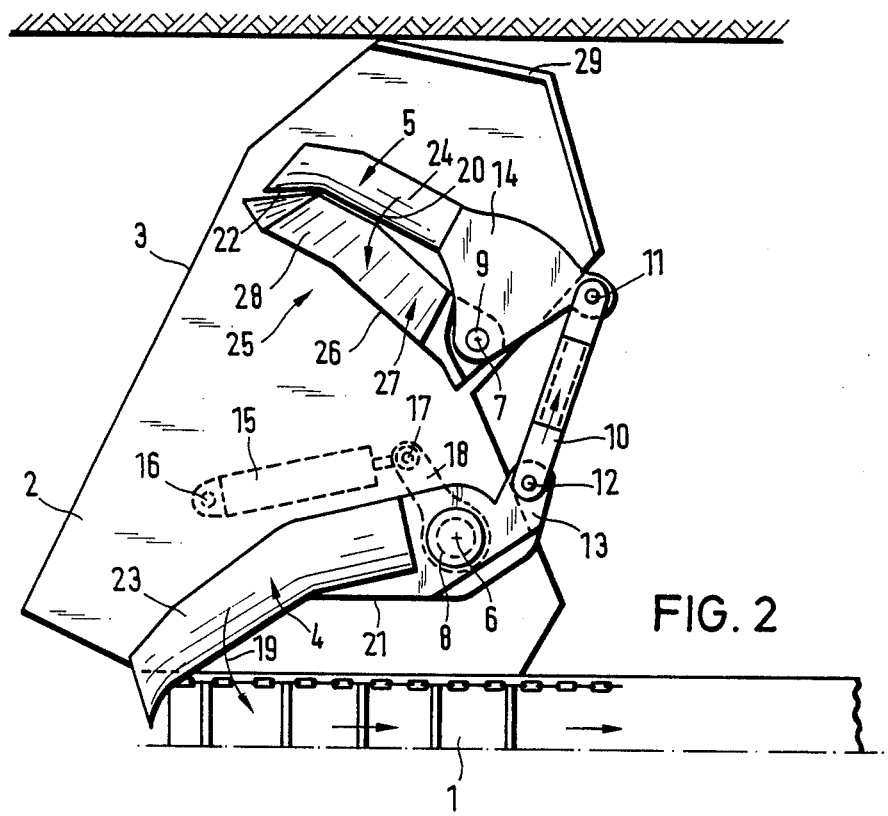
FIG. 2 is a plan view of part of the apparatus depicted in FIG. 1 but showing the loading blades in a different operating position.

Between the blades 4, 5 there is a further component 27 shaped in a similar fashion to the blades 4, 5 and positioned so as not to interfere with the pivotal motion of the blades 4, 5. This component 27 is fixed to the loading surface as by welding or by screws for example, to form a step 25 with a steep front face 26 extending substantially perpendicular to the loading surface. The component 27 has a rear face 28 which is inclined at a shallow acute angle relative to the loading surface. Material moved by the blade 5 during its delivery stroke flows smoothly and easily over the rear surface 28 of the component 27 while during the return stroke of the blade 4, the face 26 inhibits the movement of material contrary to the direction of arrow 19. During the return stroke of the blades 4, 5 the blade 4 comes to a position with its rear face 23 closely adjacent the front face 26 of the component 27 and the blade 5 comes to a position with its rear face 24 closely adjacent the ramp wall 29. During the delivery stroke of the blades 4, 5 the blade 5 comes to a position with its front face 22 closely adjacent the bottom of the rear face 28 of the component 27. In Figs. 3 to 5, FIG. 3 shows the position of the blades 4, 5 corresponding to FIG. 1, FIG. 5 shows the position of the blades 4, 5 corresponding to FIG. 2 and FIG. 4 is an intermediate position. As the blades 4, 5 reciprocate together on the delivery stroke material is transferred by the blade 5 over the rear face 28 of the component 27 and by the blade 4 onto the conveyor. As the blades 4, 5 reciprocate together on the return stroke, their rear faces 23, 24 pass through the material while the front face 26 of the component 27 prevents material from moving out of the range of the blade 4 during the return stroke. The wall 29 of the ramp 2 prevents material from being forced off the ramp by the blade 5 during the return stroke and trapped material tends to climb over the rear face 24 of the blade 5 as it moves in the direction contrary to arrow 20. This material is then transferred over the surface 28 as the blade 5 moves forward again in its delivery stroke as is material trapped by the face 26 of the component 27 moved by the forward or leading blade 4.

As can be seen from FIGS. 1 and 2, the blade 4 has a greater effective length from the pivot axis 6 to the distal end than the blade 5 and is of somewhat stouter construction. The blade 4 also moves through a greater pivot angle than the blade 5. The axes 6, 7 are disposed so that each is advanced towards the conveyor 1 in relation to the working faces 21, 22 of the blades 4, 5. This arrangement together with the illustrated configuration for the blades 4, 5 has been found to produce favourable drive characteristics with the blade 4 performing a greater proportion of the loading work.

It is possible to construct loading apparatus with more than two loading blades oscillating over a loading surface and with components 27 disposed between each pair of such blades. It is also possible to form the step 25 in some other way, such as integrally with the loading surface by bending or shaping the ramp material instead of by using a separately fabricated component 27.

We claim:

1. Loading apparatus for use in loading loose material; said apparatus comprising means defining a loading surface for receiving the material, first and second loading blades, means for pivotably supporting the blades relative to the loading surface, each loading blade having a first front face which extends at a relatively steep angle in relation to the loading surface and a second rear face which extends at a relatively shallow angle in relation to the loading surface, means for pivotably moving the loading blades in unison back and forth over the loading surface in a reciprocable manner in delivery and return strokes to cause the material to be transferred over the loading surfaces predominantly by the first faces of the blades and means defining a fixed step between the blades to assist the transfer of material by the blades, said step having a front face relative to the blade which is foremost relative to the delivery strokes which extends at a comparatively steep angle in relation to the loading surface.

2. Apparatus according to claim 1, wherein the step also has a rear surface relative to said foremost blade which extends at a comparatively shallow angle relative to the loading surface.

3. Apparatus according to claim 1, wherein the means defining the step is a component fixed to the loading surface.

4. Apparatus according to claim 1, and further comprising coupling means for interconnecting the first and second blades for common movement.

5. Apparatus according to claim 4, wherein the coupling means is a rod adjustable in length to vary the stroke of one of said first and second loading blades.

6. Apparatus according to claim 1, wherein the drive means is a piston and cylinder unit located beneath the loading surface.

7. Apparatus according to claim 1, wherein the foremost blade has a greater length measured from its pivot axis to its distal end than that of the other following blade.

8. Apparatus according to claim 1, wherein the angle of pivotal movement of the foremost blade is greater than that of the rear following blade.

9. Apparatus according to claim 1, wherein the pivot axis of the other following loading blade relative to the delivery strokes is spaced from its front face in a direction towards the foremost blade.

10. Apparatus according to claim 1, wherein the pivot axis of the foremost blade is disposed forwardly in a direction towards a delivery zone of the material in relation to the front face of the blade.

11. Apparatus according to claim 1, wherein the loading surface is limited by an upstanding wall facing the rear face of the other following blade.

12. Apparatus according to claim 1, wherein the foremost loading blade adopts an end position on the return stroke with its rear face closely adjacent the front face of the step defining means and wherein the rearmost loading blade relative to the delivery strokes adopts an end position on the forward delivery stroke with its front face closely adjacent a rear face of the step defining means.

13. Apparatus according to claim 1, embodied as a unit on one side of a scraper-chain conveyor operably associated with a partial cutting machine which conveyor also has a further similar apparatus as a unit located on the other side thereof, the units forming a symmetrical arrangement with each unit delivering material independently to the conveyor.

* * * * *